E. H. ROLLINS.
Improvement in Machines for Squaring the Ends of Boards.
No. 127,990. Patented June 18, 1872.

Witnesses.
S. N. Piper
L. N. Mölier

Edmund H. Rollins.
by his attorney.

UNITED STATES PATENT OFFICE.

EDMUND H. ROLLINS, OF BANGOR, MAINE.

IMPROVEMENT IN MACHINES FOR SQUARING THE ENDS OF BOARDS.

Specification forming part of Letters Patent No. 127,990, dated June 18, 1872.

*To all persons to whom these presents may come:*

Be it known that I, EDMUND H. ROLLINS, of Bangor, of the county of Penobscot, of the State of Maine, have invented a new and useful machine for squaring the ends of and reducing clapboards or various other kinds of lumber or material to equal lengths; and I do hereby declare the same to be fully described in the following specification and represented in the accompanying drawing, of which—

Figure 1:
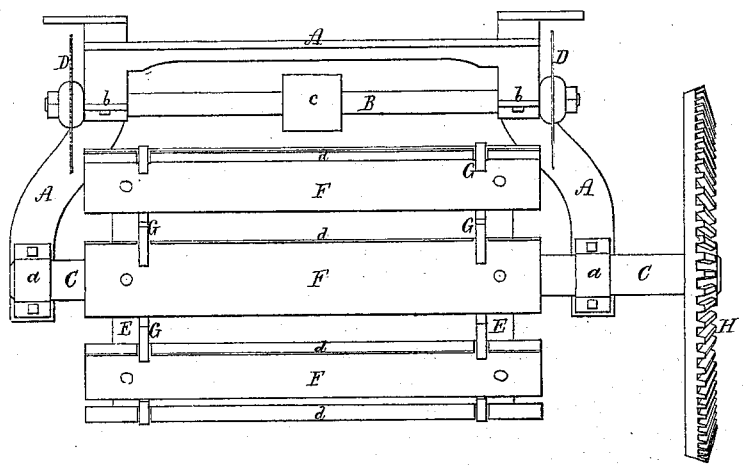
Figure 2:
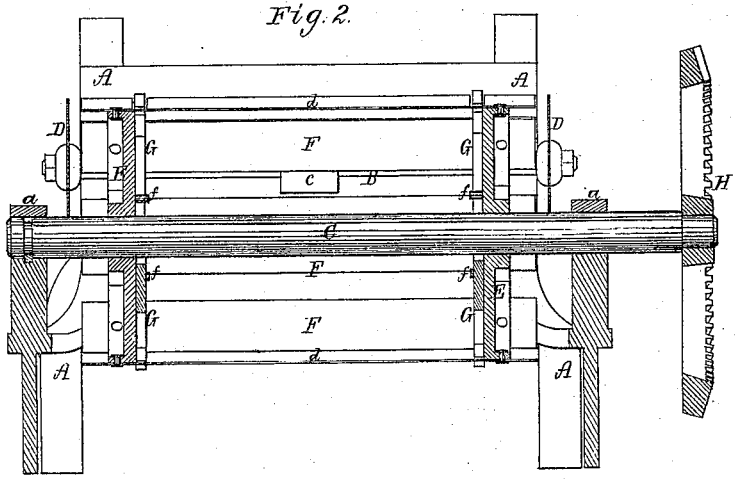
Figure 3:
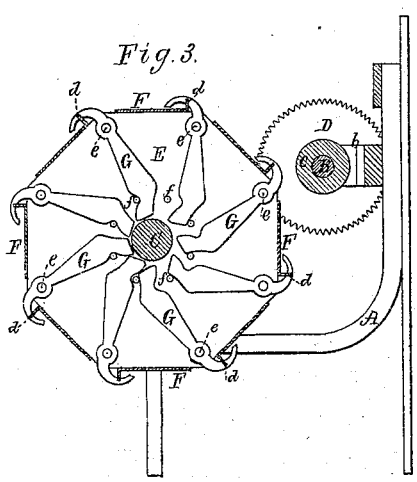

Figure 1 is a top view. Fig. 2 is a longitudinal section; and Fig. 3, a transverse section of such machine.

It is composed of two or more rotary circular saws and their shaft, two or more rotary polygonal heads and their shaft, two or more series of gravitating dogs or holders and stops applied to such heads, and sundry abutments or board-supporters, all being constructed, combined, and arranged substantially in manner and to operate as hereinafter described.

In the drawing, A denotes the frame of the machine, there being arranged within such frame or suitable bearings $a\ a\ b\ b$ thereof, two horizontal shafts, B C. To the shaft B there are fixed two circular saws, D·D, which may be so applied as to be adjustable in distance from one another, there being between them and fixed on the shaft a pulley, $c$, for putting the shaft and saws simultaneously in revolution, by means of an endless belt from a suitable motor. To the other shaft C there is fixed, concentrically with it and at suitable distances apart, two polygonal heads, E E, and there extends from one to the other of them, in manner as shown, a series of board-supporters, F F, &c., each of which is provided with an abutment or raised lip, $d$, arranged in manner as shown. Furthermore, there is pivoted to each of the polygonal heads E E a series of gravitating dogs or holders, G, they being formed and arranged in manner as shown. Each of them is a hooked lever, which turns freely on its special pivot, $e$, and swings between two of a series of pins or stops, $f f f$, projected from and arranged in the head, in manner as represented. It will be seen that the outer or shorter arm of each of these gravitating levers or dogs is a hook, and that the longer or inner arm is a heavy weight, or may be weighted. A gear-wheel, H, fixed on the carrier-shaft C, serves when put in revolution to revolve such shaft, thereby causing the heads and their adjuncts to be simultaneously revolved. If desirable there may be more of the heads and gravitating dogs, and a proper or corresponding number of saws, in which case there would be required two or more series of the board-supporters, arranged so that the intermediate saw or saws may work or extend between them while they may be in revolution. With this latter arrangement the saws would not only square the ends of each board or piece of lumber, but separate it into one or more parts.

In operating with the machine, an attendant, standing in rear of it, is to place the clapboards or pieces of lumber on the board-supporters successively, and against their abutments and underneath the hooks of the dogs of each supporter. As the boards may be advanced toward the saws the dogs will be caused to grasp the boards and to hold them firmly on the supporters during such time as the saws may be in operation to cut through such boards. After each board may have left the saws the dogs will be caused to release their hold of it, in order to allow it to drop or be discharged from its supporter by gravity.

I have contemplated applying to the machine an endless apron or carrier, to receive the discharged boards and transfer them to any distance from the machine.

I claim—

1. The machine constructed substantially in manner and to operate as described—that is, as composed of the saws and their operative shaft, the rotary polygonal heads and their shaft, the series of board-supporters with their abutments, and the series of gravitating dogs and their stops applied to each head, all arranged essentially as explained and represented.

2. I also claim the rotary board-carrier, constructed substantially as explained—viz., of the polygonal heads and their shaft, the series of board-supporters and their abutments, and the series of gravitating dogs and their stops applied to each rotary head, all being arranged as described and represented.

EDMUND H. ROLLINS.

Witnesses:
  R. H. EDDY,
  S. N. PIPER.